UNITED STATES PATENT OFFICE.

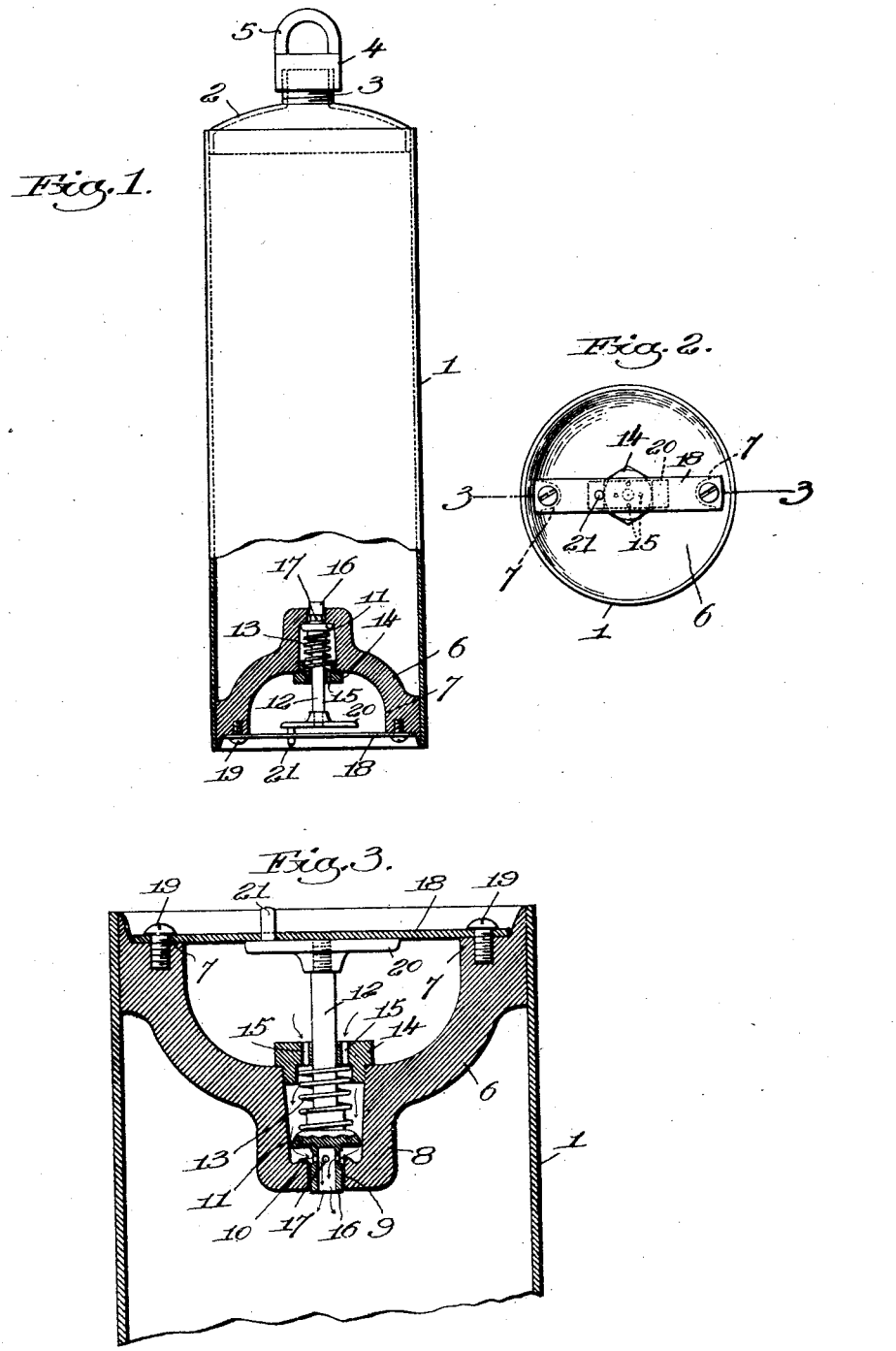

THEODORE G. STRATER, OF WEST TISBURY, MASSACHUSETTS.

WATER-BOTTLE.

957,013.  Specification of Letters Patent.  Patented May 3, 1910.

Application filed June 30, 1909. Serial No. 505,135.

*To all whom it may concern:*

Be it known that I, THEODORE G. STRATER, a citizen of the United States, and resident of West Tisbury, county of Dukes, State of Massachusetts, have invented an Improvement in Water-Bottles, of which the following description, in connection with the accompanying drawing, is a specification, like characters on the drawing representing like parts.

This invention has for its object the production of a strong and durable water bottle of large capacity and of such construction that its contents can be easily and quickly discharged when desired.

The water bottle embodying my invention is particularly adapted for use in storing hot water for use in sickness; in automobile or other vehicles in cold weather, as a foot-warmer; or for keeping hot a supply of water for several hours when it is inconvenient to continue the original source of heat.

As is well known the familiar hot-water bag, made of rubber, is restricted in usefulness because of the rapid rate at which the water cools, particularly when used by invalids or others who sleep out of doors, the rapid cooling being due to the material of which the bag is made and the small quantity of water which is held therein.

In my present invention I make the water bottle of metal, preferably in the form of an elongated cylinder or canister, and of such a size that a large quantity of water, say one gallon, can be contained therein. With this large quantity of water, and the metallic canister or body portion, I am enabled to keep the water very hot for from 10 to 12 hours or longer, provided the bottle is completely filled and the water is at or near the boiling point when the bottle is filled. It would be difficult to empty so large a bottle through the filling opening, owing to the pressure of the atmosphere, and to obviate this I have provided the bottle with means to admit air to the interior thereof at a point distant from the filling opening, so that the water will flow out rapidly and easily when the closure for the filling opening is removed and the air inlet is opened. I have provided means for opening such air inlet by or through the act of grasping the handle with which the bottle is provided, and preferably the handle is so located that when the bottle is lifted thereby the bottle will be held in inverted position, with the filling opening downward.

The various novel features of my invention will be fully described in the subjoined specification and particularly pointed out in the following claims.

Figure 1 is a side elevation and partial section of a water bottle embodying my invention, shown in upright position and with the air inlet closed; Fig. 2 is a lower end view of the bottle shown in Fig. 1; Fig. 3 is an enlarged transverse section on the line 3—3, Fig. 2 of the air inlet end of the water bottle, shown in inverted position and with the air inlet open.

In the present embodiment of my invention the water bottle comprises an elongated and preferably cylindrical body portion or canister 1, made of copper or other suitable metal, one end 2 thereof having a threaded nipple 3, Fig. 1, constituting a filling opening, for which I provide a screw-cap or closure 4. This closure may be provided with a ring-like finger-piece 5, by means of which it can be securely screwed onto the nipple, said finger-piece also providing a convenient means for carrying the bottle when filled. Herein I have shown the opposite end of the canister 1 as provided with a concave or cup-shaped head or end 6, tightly fitted into and secured fluid-tight to the canister in any suitable manner and provided with opposite shoulders 7, set in from the plane of the end of the canister, for a purpose to be described. The central portion of the end 6 is shaped to present an inwardly extended, tubular boss 8 having a central opening 9 surrounded by an annular valve-seat 10, Fig. 3. A valve 11 having an attached spindle or stem 12 is movable loosely in the boss and is held firmly upon the seat 10 by a spring 13 interposed between the valve and a guide-nut 14 screwed into the base of the boss, the spindle 12 sliding through the nut, which is perforated at 15. The inner face of the valve has a tubular guide extension 16 which slides in the opening 9 and which is provided with lateral holes 17 which are drawn outward beyond the valve-seat 10 when the valve is unseated, as shown in Fig. 3, said valve-seat providing an inlet for air to enter the canister 1 at a distance from the filling opening provided by nipple 3.

A handle member 18 is fixedly attached by screws 19 to the shoulders 7 and spans the concave canister-end 6, as shown, and within said member 18 a movable handle member 20 is fixedly secured to the outer end of the valve spindle 12, a lug 21 on the member 20 passing loosely through a hole in the member 18, to prevent rotative movement of the member 20.

Normally the expansion of the spring 13 seats the valve 11 on the seat 10, so that no air can pass into the interior of the canister 1, and at the same time the handle members 18 and 20 are separated, as shown in Fig. 1. The bottle can now be filled with water through the nipple 3, and when the closure 4 is set up tightly the bottle is closed absolutely fluid-tight, and hot water can be kept hot therein for hours, even when used out of doors.

From an inspection of the drawing it will be manifest that the air inlet cannot be opened accidentally, for the valve 11 can be unseated only by drawing the spindle 12 outward against the action of spring 13. Thus there is no danger of leakage from any accidental blow upon any part of the bottle, or upon the valve mechanism.

When it is desired to empty the bottle the closure 4 is removed and by grasping the two-part handle 18, 20 the bottle is inverted and can be held suspended in the position shown in Fig. 3. At such time the fingers of the hand close naturally around and grip the member 20 of the handle, pressing it up against the member 18, as in Fig. 3, and thereby the valve 11 is moved from its seat and the openings 17 are uncovered. A free passage for air is now provided through apertures 15, around valve 11 and through the openings 17 and the tubular extension 16 into the interior of the bottle, so that the water or other liquid therein flows freely, rapidly and smoothly out through the nipple, quickly emptying the bottle. As soon as the grasp upon the handle is relaxed the spring 13 reseats the valve automatically, closing the air inlet.

Various changes or modifications may be made by those skilled in the art without departing from the spirit and scope of my invention as set forth in the claims annexed hereto.

Having fully described my invention, what I claim as new and desire to secure by Letters Patent is:—

1. A water bottle comprising a body portion having a filling opening at one end and a normally-closed air inlet at the other end, a removable closure for the filling-opening, and a lifting device located wholly within the plane of the air inlet end of the body, by which handle the body can be held suspended in inverted position, said device including means to open the air inlet by grasping such lifting device to invert and suspend the bottle.

2. A water bottle comprising a metallic canister having a filling opening and an air inlet independent of and at a distance from such opening, a removable closure for the filling opening, a spring-seated valve to normally close the air inlet, a handle connected with the canister and having a movable member, and a connecting stem directly attached at one end to the movable member of the handle and at its other end attached directly to the valve to unseat the valve when the handle is grasped to lift the canister.

3. A water bottle comprising a metallic canister having a filling opening at one end, the opposite end being concaved and provided with an air inlet, a removable closure for the filling opening, a transverse handle member fixedly attached to the canister wholly within its concave end, a movable handle member adjacent the inner side of the fixed member and having a rigidly attached stem provided with a valve for the air inlet, and a spring to normally seat the valve and separate the handle members, relative movement of the latter one toward the other when both members are grasped to lift the canister in inverted position unseating the valve and thereby opening the air inlet.

In testimony whereof, I have signed my name to this specification, in the presence of two subscribing witnesses.

THEODORE G. STRATER.

Witnesses:
JOHN C. EDWARDS,
THOMAS J. DRUMMOND.